United States Patent [19]

Sherer et al.

[11] 4,007,705
[45] Feb. 15, 1977

[54] APPARATUS FOR TREATING A CYLINDRICAL OBJECT

[75] Inventors: C. Richard Sherer; Jack Webber, both of Houston, Tex.

[73] Assignee: DND Corporation

[22] Filed: Dec. 20, 1974

[21] Appl. No.: 534,661

[52] U.S. Cl. .................................. 118/7; 51/11; 118/307; 266/56

[51] Int. Cl.² .................................. B05C 5/00

[58] Field of Search ............ 118/305, 7, 307, 323, 118/DIG. 11; 266/23 M, 23 N, 23 NN, 56, 58; 51/8, 11; 15/88, 104.04

[56] References Cited

UNITED STATES PATENTS

| | | | |
|---|---|---|---|
| 1,915,912 | 6/1933 | Anderson | 266/23 N |
| 2,284,711 | 6/1942 | Anderson | 266/23 N |
| 2,364,963 | 12/1944 | Elliott | 266/23 N X |
| 2,408,517 | 10/1946 | Howard | 266/23 NN X |
| 2,575,737 | 11/1951 | Tyrner | 266/23 N |
| 2,594,191 | 4/1952 | Mathey | 266/23 N X |
| 3,063,697 | 11/1962 | Galezniak | 266/23 NN |
| 3,473,737 | 10/1969 | Bowman | 118/323 X |
| 3,552,731 | 1/1971 | Selkirk | 266/23 N |
| 3,889,472 | 6/1975 | Guillaud | 118/323 X |

*Primary Examiner*—John P. McIntosh
*Attorney, Agent, or Firm*—Pravel, Wilson & Gambrell

[57] ABSTRACT

Apparatus for temporary positioning about a cylindrical object such as an underwater pipeline or the like for mounting and indexing a tool across the surface of the pipeline for treating same.

37 Claims, 13 Drawing Figures

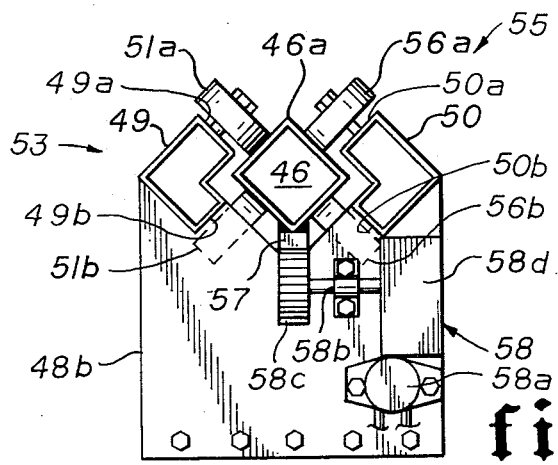
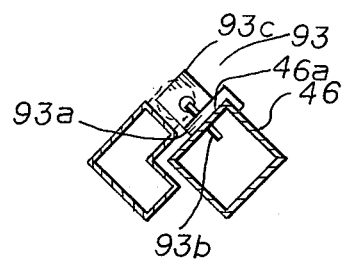
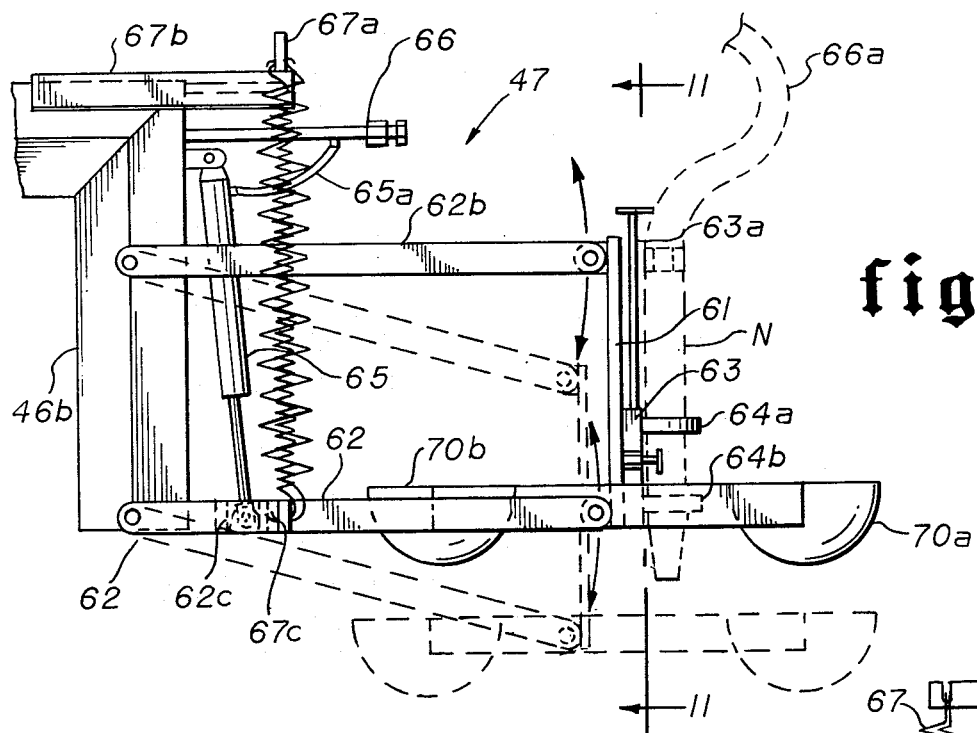
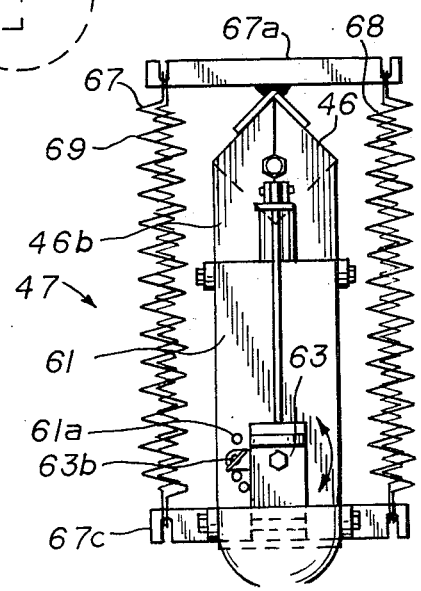
fig.9
fig.9a
fig.10
fig.11

APPARATUS FOR TREATING A CYLINDRICAL OBJECT

BACKGROUND OF THE INVENTION

The field of this invention is surface treatment of a cylindrical object such as a pipeline or the like.

Underwater pipelines are weight-coated with concrete or other material and corrosion-resistant coated. Presently, these coatings must be manually removed by divers in order to expose the surface of the pipe for performing operations such as cutting or welding. The manual removal of concrete coating from underwater pipelines is both expensive and dangerous. The danger to divers increases with an increase in the depth of the water in which the pipeline is laid. And, it is practically impossible to utilize divers without habitats to remove concrete coatings on some of the pipelines which have been laid in very deep seas throughout the world. Insofar as known, there is no adequate machinery available for removing such coatings underwater without the use of divers.

SUMMARY OF THE INVENTION

The present invention provides a new and improved apparatus for temporarily positioning about a generally cylindrical object such as an underwater pipeline, an offshore platform member or other elongated object, for the purpose of indexing a tool across the surface thereof.

In the preferred embodiment of this invention, such apparatus includes a frame assembly and means for temporarily opening the frame assembly to mount the frame assembly about the pipeline or the like. A boom assembly is mounted onto the frame assembly and includes a boom and a boom head which actually mounts a tool for movement therewith. The term "tool" includes blasting nozzles, coating nozzles, or any other tool or tool element which can perform a desired operation on a pipeline. Indexing means are mounted with the frame assembly for moving the boom assembly both longitudinally and circumferentially with respect to the pipeline surface for positioning the tool to perform a designated treatment on the pipeline.

In the preferred embodiment of this invention, the indexing means includes means for adjusting the longitudinal travel distance of the boom assembly and means for adjusting the amount of rotation of the boom assembly, which rotational movement occurs between longitudinal travel of the boom assembly. The frame assembly includes first and second pivotally mounted frame sections which are openable to receive the pipeline. Centering means are provided for centering the frame sections about the pipeline.

Hydraulic control means are provided for controlling the amount of longitudinal travel of the boom assembly as well as rotational travel of the boom assembly. The hydraulic control means includes means for providing pressure surge or pressure build-up signals which signal the end of travel in a longitudinal direction or the end of rotational travel through a predesignated angular increment. The rotational travel through a predesignated angular increment is determined by a pre-setting of a rotational adjustment mechanism providing rotational power to the boom assembly.

The features mentioned at this point are merely exemplary of the many features of the present invention. Therefore, the description just given of some of the exemplary features is not to be interpreted as limiting the claims set out at the end of this specification.

BRIEF DESCRIPTION OF THE DRAWINGS

FIG. 9 is a sectional view of the boom mounting and boom drive of this invention;

FIG. 9a is a sectional view illustrating a travel adjustment lug mounted on the boom assembly of this invention;

FIG. 10 is a side view, partly in schematic, of the boom head of this invention;

FIG. 11 is a front view of the boom head of FIG. 10; and

DESCRIPTION OF THE PREFERRED EMBODIMENT

An apparatus A is provided for temporary positioning about a pipeline or other generally cylindrical object P which may be located underwater for the purpose of systematically indexing a tool T across the surface S thereof. In the embodiment of the invention illustrated herein, the tool T is disclosed as including a nozzle N which is used to remove the concrete coating and/or corrosion coatings on the pipeline P by high-pressure blasting. The nozzle N may also be a coating nozzle as well as a blasting nozzle. In addition, it is within the scope of this invention to mount any type of tool T for systematic movement across the pipeline surface S for the purpose of performing any desired operation on the pipeline. It is further within the scope of this invention to utilize the apparatus A to perform operations on objects other than the pipeline P. The apparatus A can also be used to remove scale, marine growth or other surface impediments from a pipeline P. It is within the scope of this invention to utilize the apparatus A to perform operations on pipelines P whether located underwater or on the surface. It is further within the scope of this invention to utilize the apparatus A to perform operations on any cylindrical object. Such cylindrical object may be practically inaccessible using conventional equipment. For example, it is within the scope of this invention to use the apparatus A on the jacking legs of offshore well platforms. All of these operations may be used manually or through remotely controlled equipment such as described herein.

Figure 2:
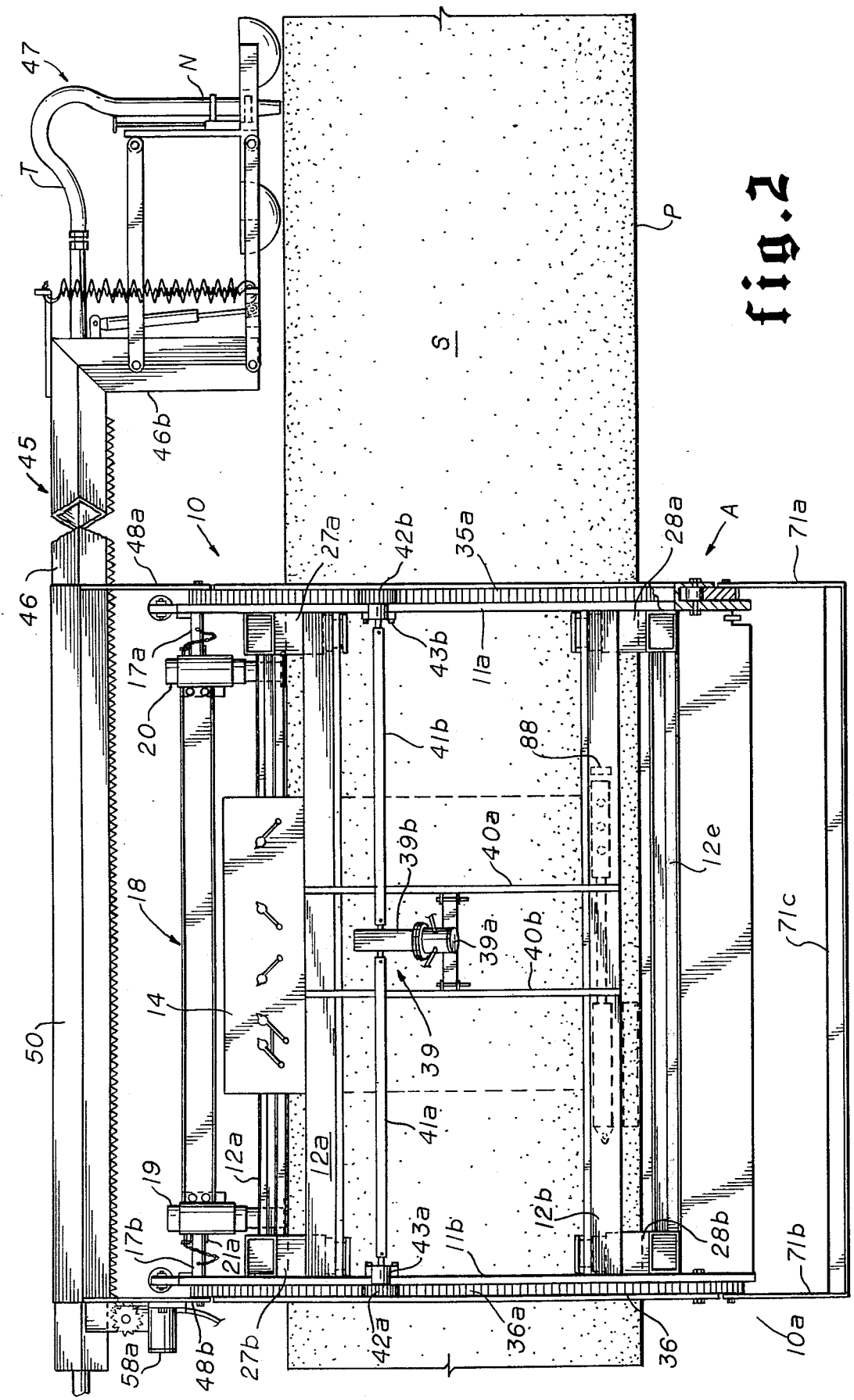
FIG. 2 is a side view taken of the apparatus of this invention.

The apparatus A includes an openable frame assembly generally designated as 10. The openable frame assembly 10 includes a first frame section 10a which is pivotally attached to a second frame section 10b for movement between an open position (FIG. 4) and a closed position (FIG. 2). The first frame section 10a includes front and rear semi-circular or semi-annular end portions 11a and 11b which are joined by suitable brace members such as channels 12a and 12b. The channels 12a and 12b may be attached to the semi-circular front and rear frame members 11a and 11b, respectively, by any suitable means such as welding or bolting. A local operating control panel 14 which forms part of the hydraulic control means generally designated as 15 (FIG. 12) is mounted onto brace member 12a.

The second frame section 10b includes a front semi-circular frame member 16a attached to a rear semi-cylindrical frame member 16b (FIG. 5) by suitable bracing similar to the braces or beams 12a and 12b.

The front end members 11a and 16a are basically identical and are mounted for pivotal movement with respect to each other by a pin 17a. Similarly, the rear end frame members 11b and 16b are mounted for pivotal movement with respect to each other by pin 17b. In the closed position, the front end frame members 11a and 16a cooperate to provide an annular front frame portion which is adapted to be centered about the pipeline P. Similarly, the rear end frame members 11b and 16b cooperate to provide an annular rear end frame member.

Figure 1:
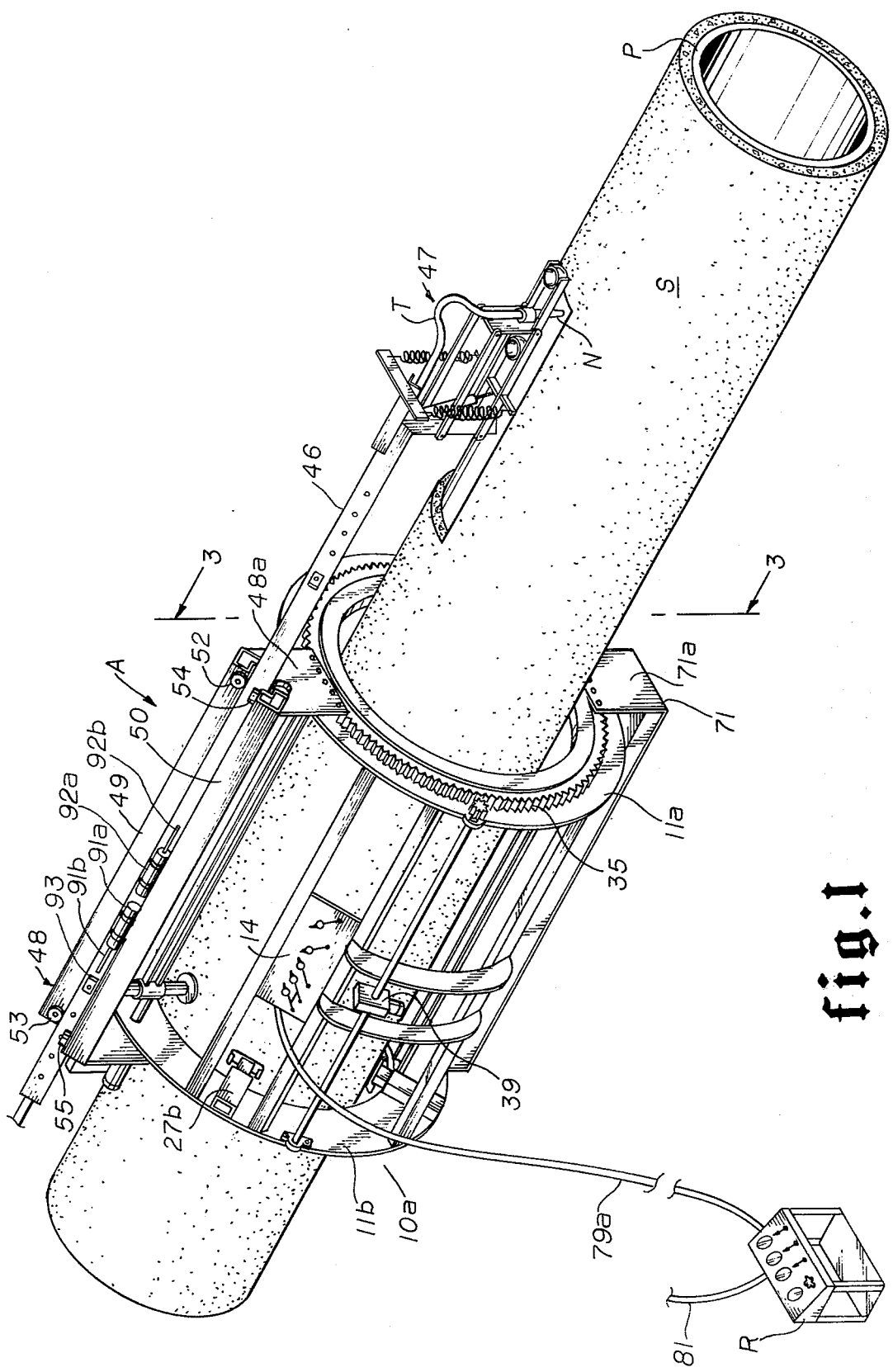
FIG. 1 is an isometric view of the apparatus of the preferred embodiment of this invention illustrted positioned about a concrete coated pipeline.
Figure 5:
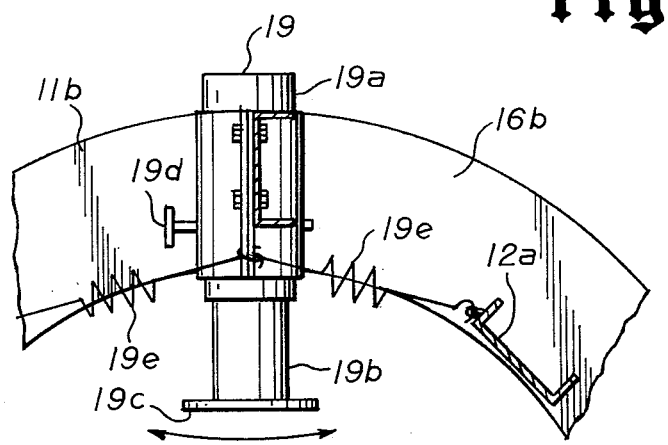
FIG. 5 is a partly schematic, segmental view of the central frame member and landing post of the frame assembly.

A central frame assembly generally designated as 18 is illustrated in FIGS. 1, 2 and 5 and includes a central I-beam 18a which terminates in landing post assemblies 19 and 20. The landing post assemblies 19 and 20 are identical except for position and include a post cylinder 19a which slidably mounts therein a landing post 19b having a flat landing rim 19c. The landing post 19b is slidably movable within the post cylinder 19a in order to adjust the post position; and, a suitable lock pin 19d is provided to lock the landing post 19b in position.

The landing post assembly 19 has a hub 21a mounted thereon to receive the pivot pin 17b. Similarly, the landing post assembly 20 includes a hub 21b which mounts the pivot pin 17a. The hubs 21a and 21b mount the entire central frame assembly 18 for pivotal movement with respect to the first and second frame sections 10a and 10b. The landing posts 19b for each of the landing post assemblies 19 and 20 are pre-set, with the first and second frame sections 10a and 10b in the open position of FIG. 4, to initially engage the top of the pipeline P as the apparatus A is moved down and over the pipeline P. Springs 19e are attached between frame braces such as 12a and the central frame member 18a to keep or return the central frame member 18a intermediate of the frame sections 10a and 10b.

The first and second frame sections 10a and 10b are pivoted between the open and closed positions by means of hydraulic cylinder assemblies 22. The hydraulic cylinder assembly 22 is of a known variety and is pivotally attached to frame lug portions 22a and 22b by suitable pins. The frame lug portions 22a are suitably attached to front and rear frame end portions 11a and 11b; and, the frame lug portions 22b are suitably attached to frame end portions 16a and 16b. The hydraulic cylinder assemblies 22 are double-acting in order to open and close the frame sections 10a and 10b. Hydraulic power is provided by the hydraulic control system 15 of FIG. 12.

Each of the front and rear frame members such as 11a and 16a have rings such as 23a and 23b welded thereon in order that the entire apparatus A can be suspended on four cable lines such as 24a and 24b.

A latch assembly generally designated as 25 is mounted onto the front and rear frame members 16a and 16b of the second frame section 10b for finally positioning and locking the frame sections 10a and 10b together about the pipeline P.

The latch assembly 25 includes a generally triangularly-shaped cam element 25a which is pivotally mounted by a suitable bearing 25b onto a channel 12c which is attached to the front and rear frame members such as 16a. A hydraulic cylinder assembly 26 is pivotally attached to a frame lug 12d and also to the cam element 25a for the purpose of rotating the cam element 25a between a down (closed) position illustrated in scored lines and an up (open) position illustrated in real lines in FIG. 6. A latch arm link 25c is pivotally attched at 25d to the cam plate 25a and is also pivotally connected at 25e to a latch arm 25f. A cam block 25j is bolted onto the front and rear frame members such as 16a at the point of pivotal connection 25e which moves within parallel guides 25i.

Figure 6:
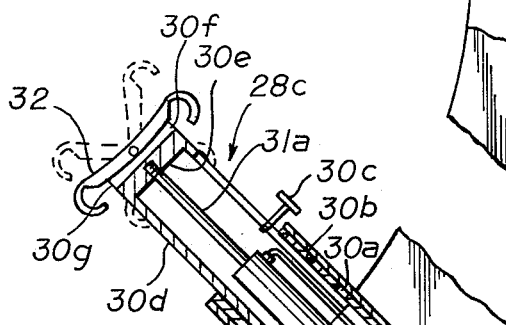
FIG. 6 is a partly schematic, segmental view of the closing latch and movable clamp for locking and clamping the frame assembly.
Figure 6:
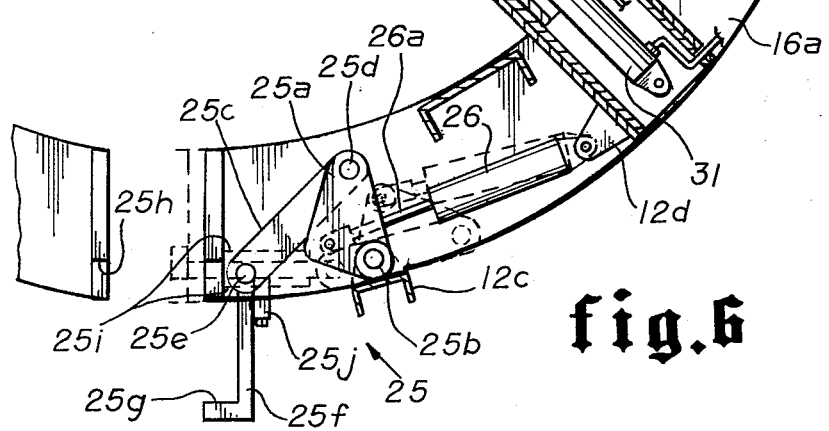

The latch assembly 25 is illustrated in FIG. 6 in real lines in the open position. In the open position, the latch arm 25f is simply resting in a down position. The cam block 25j serves to act as a stop against overtravel of the latch arm 25f. l The providing of hydraulic power from the hydraulic control means 15 to the hydraulic cylinder assembly 26 will cause retraction of the piston rod 26a. Retraction of the piston rod 26a rotates the cam element 25a to the down position illustrated in scored lines. The cam element 25a is moved to the down position, the pivotal connection point 25d is rotated and thus moved or displaced laterally. This rotational movement is transferred to the latch arm 25f through the latch arm link 25c thus causing the latch arm 25f to move or rotate to a horizontal position (illustrated in scored lines) before the latch arm can be moved laterally inwardly to the locked position. The pivotal connection 25e is confined to parallel guides 25i to insure lateral movement.

Thus, the latch arm 25f is first rotated to a horizontal position wherein shoulder end portion 25g engages a slot 25h in the front and rear frame members 11a and 11b. The latch arm 25f is then moved laterally inwardly by further rotation of the cam element 25a thereby finally pulling or pivoting the front and rear frame members 11a and 11b inwardly to a locked position. Extension of the rod 26a of the hydraulic cylinder assembly 26 moves the latch arm outwardly to a position wherein it will naturally fall to the down position.

The frame sections 10a and 10b have mounted thereon a top group of centering shoes generally designated as 27 and a bottom group of centering shoes generally designated as 28. The top centering shoe group 27 includes two centering shoes 27a and 27b which are mounted onto front and rear frame members 11a and 11b, respectively. The top centering shoe group 27 further includes two centering shoes 27c (one of which is not illustrated in the drawings) mounted onto the front and rear frame members 16a and 16b of the second frame section 10b. Each of the group centering shoes 27 are pre-set in order to engage the top portion of the pipeline P when the frame sections 10a and 10b are pivoted to a closed position about the pipeline P. Each of the pre-set centering shoes such as 27a are identical except for location and thus like numbers and letters will be used to describe like elements.

The pre-set centering shoes 27 include an outer, stationary mounting sleeve 29a which is mounted onto the frame end portions such as 11a by any suitable means such as welding. A centering shoe or piston 29b is mounted within the mounting sleeve 29a for slidable movement. The position of the slidable piston or shoe 29b is locked by means of a locking pin 29c. Each of the movable shoes 29b has pivotally mounted thereon a pad 29d identical to pad 32 to be described later.

The bottom centering shoe group 28 includes four remotely actuatable cylinder shoes such as 28a–c (the fourth shoe not being shown) which are mounted onto the bottom portion of the first and second frame sections 10a and 10b for finally clamping the first and second frame sections in a centered position about the pipeline surface S.

Referring in particular to FIG. 2, the movable shoes 28a and 28b are mounted onto the front and rear frame members 11a and 11b. Two movable shoes such as 28c are mounted in a similar position on the lower portion of the front and rear frame members 16a and 16b of the second frame section. Referring in particular to FIG. 6, each of the movable shoes includes a mounting sleeve 30a which is attached to the frame end portion 16a by suitable means such as welding. An internal, movable mounting sleeve 30b is mounted for slidable movement within the stationary sleeve 30a. The position of the slidable mounting sleeve 30b is fixed by a suitable pin 30c. A movable piston or shoe 30d is mounted for slidable movement within the sleeve 30b. A hydraulic cylinder assembly 31 is attached to the lateral brace 12e and to the end portion 30e of the shoe 30d. The hydraulic cylinder assembly 31 is provided with fluid power from the hydraulic control means 15 of FIG. 12. Extension of the rod 31a will move the shoe 30d radially inwardly into engagement with the pipeline surface S. A pad 32 is pivotally mounted onto the top 30e of the shoe 30d in a recess 30f. A pin extends between the shoe side portions 30g which form the shoe recess 30f thereby pivotally mounting the pad 32. Thus the pad 32 is capable of engaging the pipeline surface S in spite of some variation in the pipeline surfaces. The various pivotal positions of the pad 32 are illustrated in scored lines in FIG. 6.

Figure 4:
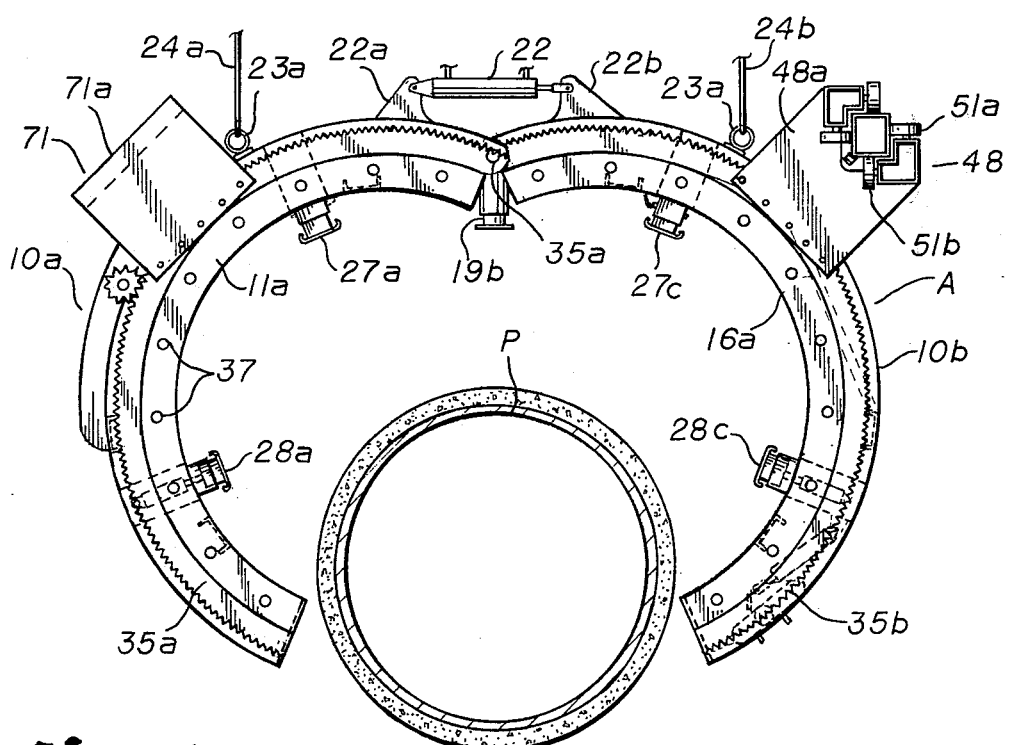
FIG. 4 is a front view similar to FIG. 3 illustrating the frame assembly in an open position to receive the pipeline.
Figure 7:
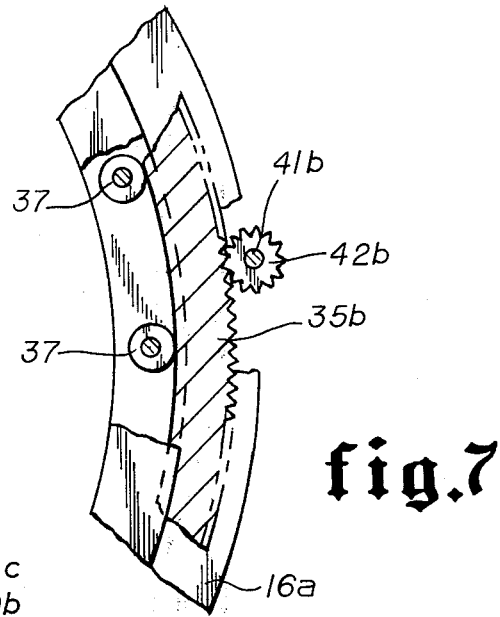
FIG. 7 is a partly schematic, segmental view of the rotational drive for driving the boom assembly of this invention.

Front and rear annular gear rings 35 and 36 are mounted for rotation onto the frame sections 10a and 10b in the following manner. The front gear ring 35 includes semi-annular gear ring portions 35a and 35b which are mounted onto front frame portions 11a and 16a as illustrated in FIG. 4. The semi-annular gear ring portions 35a and 35b are pivotally connected to each other by a suitable pin 35c. And, when the pivot pin connection 35a is aligned with the pivot pin 17a for the front frame members 11a and 16a, the semi-annular gear ring portions 35a and 35b are pivotal to an open position with the frame members 11a and 11b, respectively. In a similar manner, the annular gear ring 36 includes semi-annular gear ring portions, only 36a being shown, which are pivotally attached by a suitable pin identical to the pin attachment 35a. With the pin attachment point being aligned with the rear end frame attachment pin 17b, the semi-annular gear ring portion such as 36a are mounted on the rear end frame portions such as 11b for movement therewith to an open position to receive the pipeline P. Each of the front and rear end semi-circular frame members such as 11a and 11b include annular recess portions which receive a plurality of circumferentially spaced bearings 37 (FIG. 7). The bearings 37 serve to rollably mount the semi-annular gear ring portions such as 35a and 35b for smooth, rotational movement with respect to the semi-annular aligned frame members such as 11a and 16a.

The annular gear rings 35 and 36 are circumferentially driven or rotated by rotation power unit 39. The rotation power unit 39 includes a hydraulic motor 39a mounted onto transverse frame brace members 40a and 40b. The transverse frame brace members 40a and 40b are welded or otherwise attached to the laterally extending brace members 12a and 12b. The hydraulic motor 39a is suitably attached to a gear drive 39b for driving tandem drive shafts 41a and 41b. The drive shaft 41a terminates in a spur drive gear 42a, which is mounted in engagement with the annular gear ring 36 by suitable bearing means 43a mounted onto the rear end frame member 11b. Similarly, the drive shaft 41b terminates in a drive spur gear 42b which drivingly engages the annular gear ring 35. The spur drive gear 42b is mounted for driving rotation by a suitable bearing means 43b which is mounted onto the front semi-annular or semi-circular frame member 11a. The hydraulic motor 39a is driven by the indexing means 15 of FIG. 12.

Figure 3:
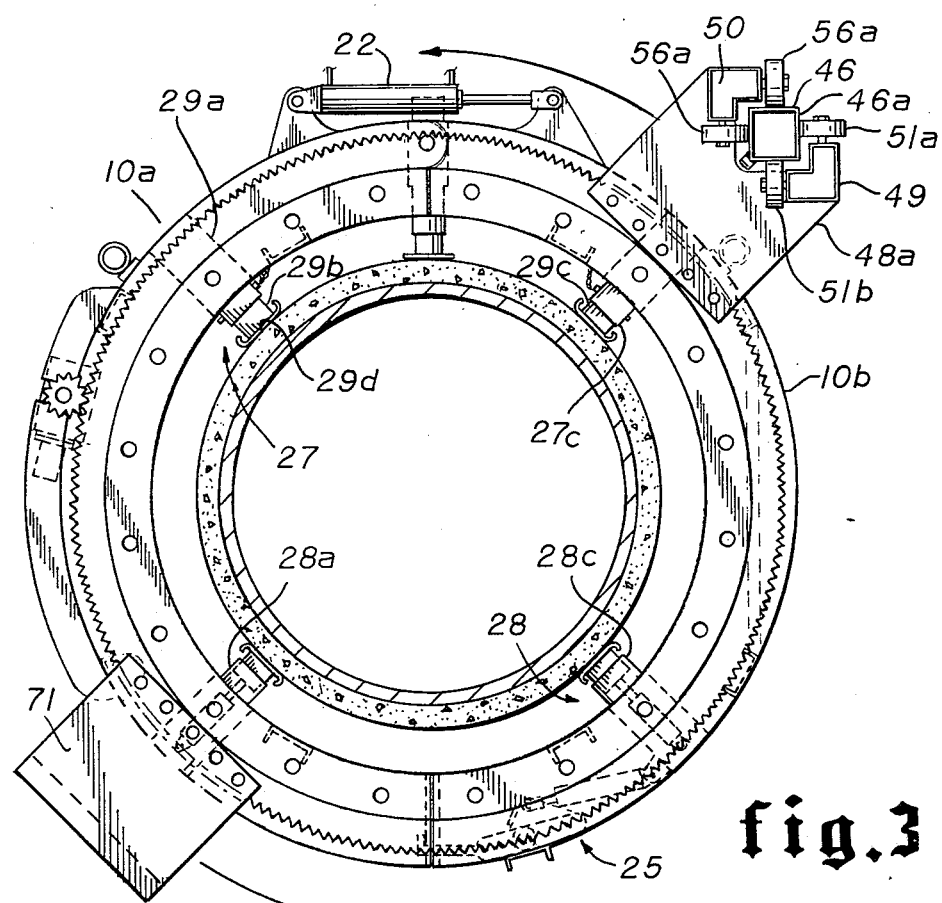
FIG. 3 is a front view taken along line 2—2 of FIG. 1 of the apparatus of this invention.

A boom assembly generally designated by the number 45 is mounted onto the frame assembly 10 for supporting the nozzle N of the tool T during both circumferential and longitudinal movement. The boom assembly 45 includes a boom member 46 which is substantially square in cross-section as illustrated, for example, in FIGS. 3, 4 and 9. The boom member 46 thus includes four flat sides 46a. The boom member 46 is elongated to form a travelling beam terminating in a transverse end portion 46b. The transverse end portion 46b mounts a boom head generally designated as 47 thereon.

The boom member 46 is mounted for movement longitudinally with respect to the pipeline by longitudinally oriented mounting track assembly 48. The mounting track 48 includes end plates 48a and 48b. The end plates 48a and 48b support side track members 49 and 50. The end plate 48a is mounted onto the annular gear ring 35 by suitable bolts. Similarly, the end plate 48b is mounted onto the annular gear ring 36 by suitable bolts. The side tracks 49 and 50 are welded or otherwise suitably attached to the end plates 48a and 48b. The side track 49 includes internal track surfaces 49a and 49b which are at right angles with respect to each other. Similarly, the side track 50 includes mutually perpendicular internal surfaces 50a and 50b.

The side track 49 has mounted thereon front and rear sets of mutually perpendicular rollers 51a and 51b. The rollers 51a and 51b are mounted on track surfaces 49a and 49, respectively, and are positioned to engage two adjacent sides 46a of the beam 46. Rollers 51a and 51b mounted adjacent to end plate 48a provide a front set of mounting rollers generally designated by the number 52 and rollers 51a and 51b mounted on track 49 adjacent end plate 48b provide a rear set of rollers generally designated as 53.

The track 50 mounts a set of rollers 54 adjacent to end plate 48a and another set of rollers 55 adjacent to end mounting plate 48b. Each set 54 and 55 of rollers includes rollers 56a and rollers 56b which are suitably mounted onto the track 50 to be positioned at right angles with respect to each other in order to engage adjacent, mutually perpendicular surfaces of the elongated boom 46. In this manner, the sets of rollers 52, 53, 54 and 55 cooperate to mount the boom 46 for longitudinal movement parallel to the central axis of the pipeline P and of the closed frame assembly 10.

A rack gear 57 is mounted onto a corner formed by two adjacent sides of the boom 46 and extends substantially the length of the boom. Referring in particular to FIG. 9, which is a rear end view of the apparatus A facing the rear end mounting plate 48b, a boom drive unit 58 is illustrated for moving the boom between extended and retracted positions longitudinally of the pipeline P. The boom drive means 58 includes a hydraulic motor 58a mounted onto the rear end mounting plate 48b. The hydraulic motor 58a is connected through a suitable gear box 58d, a suitable drive shaft 58b to a spur gear 58c which drivingly engages the boom rack gear 57. Hydraulic fluid under power is provided to the boom hydraulic motor 58a by the hydraulic control means 15. The hydraulic motor 58a is reversible in order to reverse rotation of the spur drive gear 58c thus reversing the direction of longitudinal movement of the boom 46 and boom head 47 mounted thereon.

The boom head 47 includes a base plate 61 mounted for pivotal movement onto the boom end 46b by a parallelogram-type pivoting linkage 62. The pivoting linkage 62 includes upper and lower sets of two link arms 62a and 62b which are pivotally attached to the base plate 61 and to the boom end portion 46b. The pivoting linkage 62 mounts the base plate 61 for pivotal movement toward and away from the pipeline surface S while keeping the base plate 61 in the same plane of orientation perpendicular to the pipeline surface S. A nozzle mounting plate 63 is pivotally mounted by a suitable pin connection onto the base plate 61. The nozzle mounting plate 63 includes mounting rings 64a and 64b which receive the tool nozzle N and hold the nozzle at a predetermined position with respect to the pipeline surface S. The pivotal mounting of the nozzle mounting plate 63 allows for an angular adjustment of the nozzle N with respect to the pipeline surface S if necessary. A handle 63a extends upwardly from the nozzle mounting plate 63; and, a removable mounting pin 63b is mounted onto the nozzle mounting plate 63 for alignment with one of a group of holes 61a in the boom head base plate 61. In this manner, the angular position of the nozzle N may be adjusted without removing the nozzle from the mounting rings 64a and 64b. A hydraulic cylinder assembly 65 is pivotally mounted onto the boom end portion 46 and also onto a transverse bar 62c which extends between the bottom set of linkage arms 62a. A fluid line 65a extends from the hydraulic cylinder assembly 65 to an orifice placed in cleaning fluid line 66 which is connected by suitable means to the flexible nozzle line 66a. Thus, the hydraulic cylinder assembly 65 uses the same fluid or medium at the same pressure as is used in the nozzle N itself. Two sets of spring elements 67 and 68 act to yieldably urge the entire boom head 47 away from the pipeline surface S to thereby cause the boom head 47 to retract when not in use. A transverse spring bar 67a is welded or otherwise attached onto an angle bar 67b which is itself attached to the boom end portion 46b. A second spring mounting bar 67c suitably mounted with the linkage arms 62a. One or more spring members 69 extend between the spring mounting bars 67a and 67c to urge the pivoting linkage arms 62a and 62b and the rest of the boom head 47 away from the pipeline surface S.

Guide members 70a and 70b are mounted onto the linkage arms 62a for continually engaging the pipeline surface S in spite of variations therein. The guide members 70a and 70b are hemispherical cups welded in place between linkage arms 62a and provide smooth, curved surfaces for continually engaging the pipeline surface S in spite of variations therein. The guide members 70a and 70b further serve to maintain the nozzle N at a particular distance away from the pipeline surface S in spite of surface variations.

A counterweight assembly 71 is mounted on the annular gear rings 35 and 36 diagonally opposite from the mounting for the boom 46. In the embodiment of the invention illustrated herein, the boom mounting plates 48a and 48b are mounted by bolts to semi-annular gear ring members such as 35b mounted in FIG. 4 on the front and rear frame members 16a and 16b. The counterweight assembly 71 is mounted onto the semi-annular gear ring members 35a and 36a in a position diagonally opposite from the mounting plates 48a and 48b. The counterweight assembly 71 includes an end mounting plate 71a attached by bolts to the semi-annular gear ring 35a and an end plate 71b attached to semi-annular gear ring member 36a. A counterweight beam member 71c is attached to the end members 71a and 71b. The weight of the beam 71c may itself be sufficient to provide the desired balancing weight which offsets the weight of the boom assembly 45. It is, of course, within the scope of this invention to vary the weight as necessary to properly offset the weight of the boom assembly 45.

Hydraulic Control System

Figure 12:
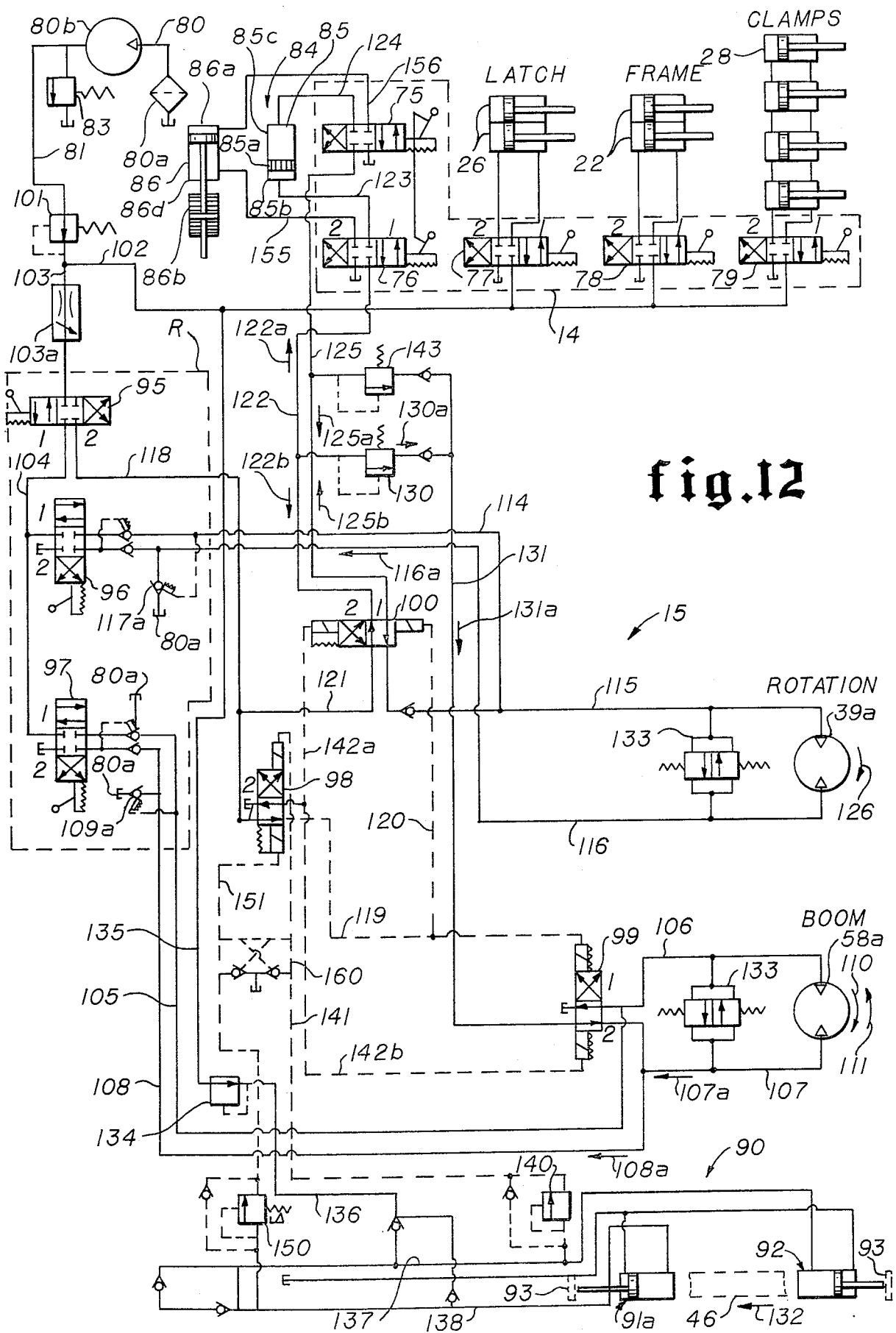
FIG. 12 is a hydraulic schematic of the hydraulic control mechanism of this invention.

The hydraulic control means 15 of FIG. 12 provides pressurized hydraulic fluid to the various hydraulic motors on the apparatus A in a predesignated sequence in order to cause the boom 46 and boom head 47 to move the nozzle N about the pipeline surface S in a predesignated indexing and travel pattern. The hydraulic control means 15 includes the boom hydraulic motor 58a and the rotation hydraulic motor 39a previously described. The operating panel 17 mounted on frame section 10a is also schematically illustrated in FIG. 12. The operating panel 14 includes five operating valves 75–79 for opening, closing and latching the frame sections 10a and 10b and opening centering clamps 28. The hydraulic control means 15 also includes a remote operating station R which includes valves 95–97 for manually or automatically indexing the nozzle N across the pipeline surface S. A series of hydraulic lines represented by the main line 81 will extend from a surface supply station 80 to the remote station R. Line 79a represents a bundle of hydraulic lines extending from station R to the apparatus A. The supply station 80 includes a main hydraulic supply or sump 80a which is connected to supply hydraulic pump 80b. A suitable surface pressure release valve 83 is mounted in line 81 to vent the hydraulic fluid back to sump or reservoir 80a in the event of an undesirable pressure increase. The surface equipment 80 and the remote station R can be combined and located either underwater or on the surface.

Figure 8:
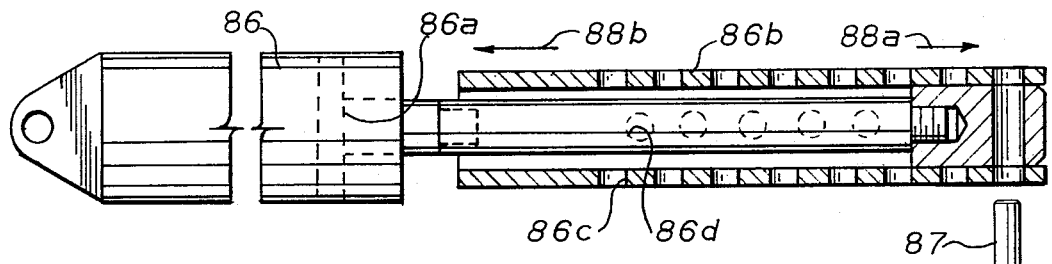
FIG. 8 is a partly schematic and partly sectional view of the rotational adjustment mechanism.

Angular adjustment means generally designated as 84 or provided for adjusting the angular increment of rotational travel of the boom assembly 45. The angular adjustment means 84 includes a first hydraulic cylinder 85 having a piston 85a mounted therein. A secondary hydraulic cylinder 86 is mounted independent of the first hydraulic cylinder 85 and includes a piston and rod combination 86a having an adjustable displacement. The adjustable displacement is provided by sleeve 86b which has a plurality of adjustment holes 86c (FIG. 8) which may be aligned with adjustment holes 86d in the piston and rod combination 86a. A pin 87 locks the adjustment sleeve in position on the piston and rod combination 86a. The adjustment sleeve 86b acts to limit the displacement of the piston and rod combination 86a in the direction of arrow 88b simply by engaging the end of the hydraulic cylinder and limiting further movement of the piston and rod combination. Movement of piston and rod combination 86a in direction of arrow 88a is limited by engagement of the piston with the end of the cylinder. The secondary adjustment cylinder 86 is mounted onto the frame brace 12b by any suitable means. The hydraulic cylinder 85 is also mounted on the brace 12b.

Means generally designated by the number 90 are provided for adjusting the longitudinal travel distance between extended and retracted positions of the boom assembly 45. The longitudinal travel adjustment means 90 includes an extension limit means generally designated as 91 and a retraction limit means generally designated as 92. Both the extension and retraction limit means 91 and 92 provide for a significant increase in system pressure within the hydraulic control means 15 in response to the boom 46 reaching the desired end of its travel in one direction. This substantial pressure increase or build-up is utilized as a signal to de-activate the boom motor 58 and actuate the rotation motor 39a.

The extension limit means 91 includes a hydraulic cylinder assembly 91a mounted onto the boom track 49 in a position adjacent to one of the top, flat sides 46a of the boom 46. The hydraulic cylinder assembly 91a includes a rod and piston combination 91b which extends outwardly toward the rear frame members such as 11b. An adjustable actuator plate 93 is mounted in one of several aligned openings in the boom side portion 46a for engaging the rod and piston combination 91b in order to increase the pressure within the cylinder. The adjustable actuator lug 93 is illustrated in greater detail in FIG. 9a. An L-shaped plate 93a is adjustably mounted by a releaseable pin 93b into one of the boom holes. The lug includes an upstanding end portion 93c which extends upwardly from the beam side 46a sufficiently to engage the rod and piston combination 91b of the cylinder assembly 91a.

Similarly, the retraction limit means 92 includes a hydraulic cylinder assembly 92a mounted onto the side track 49. A piston and rod combination 92b extends outwardly toward the front frame members such as 11a. Another adjustable actuator lug 93 is mounted in one of several openings in the front portion of the beam 46. As the number indicates, the actuator lug 93 is identical to the lug of FIG. 9a already described and is merely positioned in a desired, different location to engage the rod and piston combination 92b of the hydraulic cylinder assembly 92a in order to create a pressure build-up therein in response to the boom 46 reaching the predesignated end of longitudinal travel to a retracted position.

The valves 75–79 for the station 14 are four-way, three-position lever operated valves. Such a valve is manufactured by Barksdale Company, Model No. 6142R3HC3. Valves numbered 95, 96 are also four-way, three-position lever operated valves which form part of the remote station R. The remaining principal valves in the hydraulic network are numbered 98, 99 and 100 and are four-way, two-position valves manufactured by Parker Company. Of course, the valves are all interconnected by hydraulic lines which will be hereinafter labeled as needed in describing the operation of the system.

As previously mentioned, the hydraulic supply comes through fluid line 81 from surface pump 80b. The hydraulic supply passes through a pressure reducing valve 101 and supplies high-pressure hydraulic fluid to main lines 102 and 103. In using the apparatus A, the operator valve 78 at panel 14 is moved to position 1 wherein hydraulic fluid under pressure is applied to the frame opening cylinders 22 in order to pivot openly the first and second frame sections 10a and 10b in a manner previously described. After the apparatus A has been lowered down over the pipeline P, the operator valve 78 is moved to position 2 wherein the supply of fluid from line 102 acts on the hydraulic cylinders 22 to move the entire frame to a closed position. Operator valve 77 at panel 14 is then moved to position 1 to contract the piston and rod combinations 26a for the hydraulic cylinders 26 thus moving the latch arm 25f to a closed position. The operator valve 79 at panel 14 is then moved to position 1 in order to extend the piston and rod combinations 31a of the hydraulic cylinder assemblies 31 thereby moving the bottom group of centering shoes 30 to a radially extended position in which the closed frame sections 10a and 10b are centered about the pipeline surface S.

After proper preparation of the tool T, the apparatus A is either indexed manually or automatically utilizing the valves 95–97 at remote station R. The remote station R is generally located on the ocean floor some distance from the apparatus A. Manual operation is provided in the following manner. Valve 95 is moved to position 1 to provide hydraulic fluid under pressure from line 81 through line 103 to line 104 and thus to the valves 96 and 97. Valve 97, which is positioned in FIG. 1, acts as the manual boom drive valve and passes hydraulic fluid from line 104 to line 105 into line 106 which connects to the hydraulic motor 58. Line 107 acts as the return for the boom motor 58 and returns fluid back through line 108 to sump 80a. The sump 80a is opened to act as a return sump due to pressure from line 105 acting on check valve 109a. In this manner, the hydraulic boom motor 58a is moved in one linear or longitudinal direction designated by the arrow 110. The boom 46 can also be driven in the opposite direction designated by arrow 111 by moving the manual boom drive valve 97 to position 2. In position 2, line 108 acts as the fluid pressure line and provides hydraulic fluid from line 104 to hydraulic motor line 107 in order to drive the hydraulic motor in the opposite direction of rotation arrow 111. With the manual boom drive valve 97 in position 2, line 106 exhausts fluid to line 105 into sump 80a.

The valve 96 acts as the rotation drive valve to cause the annular ring gears 35 and 36 and thus the boom assembly 45 to rotate or travel circumferentially about the pipeline surface S. In position 1, the rotation drive valve 96 provides hydraulic supply fluid from line 104 to lines 114 and 115, line 115 being connected to the rotation drive motor 39a. Line 116, which is also connected to the hydraulic motor 39a, extends to the rotation drive valve 96 and acts as the return to sump 80a through check valve 117a. If desired, the hydraulic motor 39a may be driven in the opposite direction by moving the rotation drive valve 96 to position 2 wherein line 116 now acts as the fluid pressure line to the hydraulic motor 39a. The manual operating system provided by valves 96 and 97 supersedes the automatic indexing system to be provided hereinafter. It is within the scope of this invention to operate the manual boom drive valve 97 simultaneously or in sequence with operation of the rotation drive valve 96.

Automatic operation of the hydraulic system 15 takes place in the following manner. First of all, it should be mentioned that the hydraulic cylinder 85 having piston 85a therein has been sized to determine the amount of fluid that may be displaced within the cylinder 85 in order to drive the rotation hydraulic motor 39a. The larger the size of the hydraulic cylinder 85, the greater the amount of fluid which may be delivered to the rotation motor 39a thereby driving the boom assembly 45 through a greater angular increment. The angular increment can also be determined by utilizing the secondary angular adjustment cylinder 86. The utilization of the adjustable angular increment cylinder 86 will be described after the entire automatic indexing system has been described utilizing the primary angular increment or travel cylinder 85.

To initiate automatic operation, valve 95 is moved to position 2 which delivers hydraulic fluid from line 103 through flow regulator 103a into line 118. Line 118 extends to the control valve 98, which is in position 1. In position 1, the control valve 98 provides fluid pressure through pilot line 119 to valve 99, thus moving valve 99 to position 1. The application of fluid pressure to pilot line 119 also applies fluid pressure to pilot line 120, which moves or maintains the control valve 100 in the illustrated position 1. The positioning of control valve 100 in position 1 allows the application of fluid pressure from line 118 through line 121, through valve 100 into line 122 and finally to valve 76. Both valves 76 and 75 have been manually set in position 1. In position 1, the valve 76 delivers the fluid pressure from line 122 to line 123 and thus to side 85b of the constant angular increment cylinder 85. The application of fluid pressure to side 85b displaces piston 85a toward cylinder side 85c thus delivering fluid under pressure along the following path: through line 124, valve 75 in position 1, line 125, through valve 100 in position 1 and into line 115 to hydraulic motor 39a. Thus the hydraulic motor 39a is driven by supply pressure from line 122 through displacement of piston 85a. The displacement of piston 85a is limited by the size of the cylinder 85. As previously mentioned, the size of the cylinder 85, i.e., the length and diameter, thus determines the amount of fluid displaced and delivered into the hydraulic motor 39a. The delivery of only a fixed amount of fluid to the hydraulic motor 39a serves to fix the amount of angular increment through which the hydraulic motor 39a can drive the boom assembly 45.

As the piston 85a ends its upward stroke towards cylinder side 85c, the pressure in lines 124, 122 and 115 drops to zero thus stopping the hydraulic motor 39a, which is rotating in the direction of arrow 126. The input of driving fluid pressure through line 115 makes line 116 act as a return line exhausting fluid to sump 80a as previously described. The line 114 as well as line 115 receives the fluid input from line 125, which pressure opens check valve 117a thus allowing fluid to return through line 116 in the direction of arrow 116a.

When the piston 85a ends its upward stroke against cylinder side 85c, a pressure build-up in line 122 occurs. When the pressure build-up reaches a predetermined level, switching valve 130 is activated to deliver fluid in the direction of arrow 130a to power line 131. The delivery of fluid through the power line 131 in the direction of arrow 131a delivers fluid power through valve 99 in position 1 to line 106 thus driving hydraulic motor 58 in a direction of rotation 110. Actuation of the boom hydraulic motor 58a in the direction of arrow 110 moves the boom 46 and boom head 47 with the tool nozzle N mounted thereon in the longitudinal or transverse direction 132 towards a retracted position. During rotation in the direction of arrow 110, line 107 again acts to exhaust fluid in the direction of arrow 107a in direction 108a in line 108 to sump 80a.

It should be noted that both hydraulic motors 39a and 58a have mounted parallel thereto pressure by-pass valves 133 which merely provide for a complete by-pass of the hydraulic motors in the event of an undesirable pressure surge or build-up.

Valve 134 is mounted in line 135 which attaches to supply line 102. The valve 134 supplies fluid at a reduced pressure to line 136 which extends through check valves to lines 137 and 138. Pressure in lines 137 and 138 acts to keep the piston and rod combination such as 92b for the hydraulic cylinder assembly 92a in an extended position, even in view of external underwater pressure.

As the boom assembly 45 moves longitudinally to a retracted position, the outer actuator lug 93 approaches the cylinder assembly 92a and finally the rod and piston combination 92b. In this manner, the piston and rod combination 92b is displaced thereby displacing and increasing the pressure in line 137. Upon reaching a predesignated level, the increased pressure in line 137 moves valve 140 to an open position thus providing fluid signal pressure to pilot line 141. Which pressure in line 141 moves control valve 98 to position 2. In position 2, the control valve 98 delivers fluid pressure from line 118 to pilot line 142a which moves valve 100 to position 2. Simultaneously, fluid pressure is delivered to pilot line 142b thus moving control valve 99 to position 2. Switching of the valve 100 to position 2 cuts off the application of fluid pressure to line 122 and initiates delivery of fluid pressure to line 125 in the direction of arrow 125b. Fluid pressure is delivered through valve 75 to line 124 and to cylinder side 85c. The application of pressure against the piston 85a moves the piston towards cyliner end or side 85b which increases the pressure in line 123 to a rotation motor drive level.

Fluid pressure in line 123 in the direction of arrow 122b passes through valve 100 in position 2 into rotation motor intake line 115, which drives the rotation hydraulic motor 39a through a predesignated angular increment in the same direction 126. In this manner, the boom assembly 45 is moved through another angular increment in the same circumferential direction as before. As the piston 85a reaches the end of the cylinder side 85b, the pressure driving the rotation motor 39a drops thereby ending that rotational cycle. At the same time, the pressure in line 124 builds up. When the pressure in line 124 and connected line 125 reaches a predesignated level, valve 143 is opened and hydraulic pressure is again supplied to power line 131 in the direction of arrow 131a. However, the valve 99, which is now in position 2, delivers the fluid pressure to line 107 rather than line 106. In this manner, the boom drive motor is driven in the opposite direction 111 and the boom assembly 45 including the boom 46 and boom head 47 is moved longitudinally outwardly towards an extended position.

The inside lug 93 engages and moves the rod and piston combination 91b of the cylinder assembly 91a at the predetermined end of the travel distance for extension of the boom assembly 45. Displacement of the rod and piston combination 91b pressurizes the hydraulic fluid in line 138 thereby opening pressure control valve 150 and delivering fluid pressure to pilot line 151 which returns control valve 98 to position 1. Returning control valve 98 to position 1 delivers fluid pressure to pilot lines 119 and 120 thereby returning control valves 99 and 100 to position 1. In this manner, the boom motor 58a is stopped and fluid pressure is again delivered along arrow 122a through valve 76 to line 123 to again displace piston 85 and drive rotation hydraulic motor 39a in a manner previously described. This entire cycle is automatically and continually repeated as long as necessary.

The fixed angular increment cylinder 85 delivers to rotation hydraulic motor 39a a predetermined fixed amount of fluid sufficient to rotate the motor 39a and thus drive the annular gear rings 35 and 36, boom 46 and boom head 47 with nozzle N mounted thereon though a predetermined fixed angle. The angular increment through which rotation hydraulic motor 39a drives the nozzle N may be adjusted in the following manner. Control valves 75 and 76 may be moved to position 2 in order to deliver hydraulic fluid from either line 122 or line 125 to the secondary angular increment adjustment cylinder 86. For example, fluid pressure from line 122 applied in the direction of arrow 122a passes through valve 76 in position 2 into line 155 and thus into cylinder side 86d. The application of fluid pressure to cylinder side 86d displaces the piston 86a, which displacement or movement continues until adjustment sleeve 86b engages the end of the cylinder thereby preventing further movement. As the piston 86a is displaced, fluid pressure is delivered through line 156, through valve 75 in position 2 to line 125 in the direction of arrow 125a thus driving the rotation motor 39a in a manner previously described. When the adjustment sleeve 86b engages the cylinder 86, a pressure build-up will occur in line 155 and thus in line 122, which causes actuation of the boom drive motor as previously described. Displacement of the piston 86a is limited by the piston 86a hitting the end of the cylinder in response to the application of fluid pressure from line 125. Thus, the application of fluid pressure through line 125, through valve 75 in position 2 and through line 156 displaces the piston 86a until it hits the end of the cylinder; and, during such movement, fluid pressure is delivered through line 155 to line 125 in order to drive the rotation hydraulic motor 39a in a manner previously described.

It should also be noted that a pilot line bleed valve 160 is connected to pilot lines 141 and 151 in order to allow for a pressure reduction in one pilot line leading to the control valve such as 98 when pressure is applied in the opposite pilot line in order to allow the valve to move to a different position.

The foregoing disclosure and description of the invention are illustrative and explanatory thereof, and various changes in the size, shape, and materials as well as in the details of the illustrated construction may be made without departing from the spirit of the invention.

We claim:
1. Apparatus for temporary positioning about a generally cylindrical object for indexing a tool across the surface thereof, comprising:
   a frame assembly and means for temporarily opening said frame assembly to receive a cylindrical object;
   a boom assembly including a boom and a boom head, said boom head including tool mount means adapted to mount a tool for movement with said boom head;
   indexing means for moving said boom assembly longitudinally and circumferentially of said pipe surface thereby positioning said tool to perform a designated treatment on said cylindrical object;
   said indexing mans including rotation hydraulic control means for moving said boom assembly through a predesignated angular increment and boom hydraulic control means for moving said boom assembly through a predesignated length of movement in first and second longitudinal directions; and
   said index means including intercontrol means operatively interconnecting said rotation hydraulic control means and said boom hydraulic control means for operating said boom assembly for movement longitudinally and circumferentially in any desired time relationship.

2. The structure set forth in claim 1, wherein said indexing means includes:
   travel adjustment means for adjusting the distance of longitudinal movement of said boom assembly in said first and second directions; and
   rotation adjustment means for adjusting the amount of rotation of said boom assembly between longitudinal travel thereof.

3. The structure set forth in claim 1, wherein said frame assembly includes:
   first and second semi-cylindrical frame sections pivotally connected together; and
   pivot means for pivoting said frame sections between an open position to receive said pipe and a closed position with said cylindrical object positioned within said frame sections.

4. The structure set forth in claim 3, including:
   a latch assembly mounted with said first frame section, said latch assembly including a latch arm; and
   latch actuator means mounting said latch arm for rotational and lateral movement for locking said second frame section in a closed position with said first frame section.

5. The structure set forth in claim 4, wherein said latch actuator means includes:
   a cam element mounted onto said first frame section for pivotal movement with respect thereto;
   a power unit pivotally attached between said first frame section and said cam element for rotating said cam element; and
   said latch arm being pivotally connected to said cam element whereby a pivoting of said cam element by said power unit causes rotational and lateral movement of said latch arm.

6. The structure set forth in claim 3, including:
   a central frame member;

frame connector means attaching said central frame member to said first and second frame sections; and said central frame member having a landing post attached thereto for initially engaging said cylindrical object with said frame sections open in order to initially position said frame section for closure about said object.

7. The structure set forth in claim 3, including:
a plurality of circumferentially spaced centering shoes for centering said frame sections in a closed position about said object, said centering shoes including a first group for engaging one portion of the surface of said object and a second group for engaging an opposite portion of said object surface.

8. The structure set forth in claim 7, including:
means for pre-setting the radial position of said first group of shoes in order to initially engage said object with said frame section in a closed position.

9. The structure set forth in claim 8, including:
shoe power means for radially moving said second group of shoes to a clamped position after said first group of shoes has engaged said object.

10. The structure set forth in claim 9, including:
remote control means for remotely actuating said shoe power means.

11. The structure set forth in claim 1, wherein said frame assembly includes:
a first semi-cylindrical frame section including semi-circular end members joined by bracing;
a second semi-cylindrical frame section including semi-circular end members joined by bracing;
a central frame member;
pivot connection means pivotally connecting said end members of said first and second sections together for pivotal movement between an open position to receive said pipe and a closed position; and
said pivotal connection means further connecting said central frame member for pivotal movement with respect to both said first and second frame sections.

12. The structure set forth in claim 11, including:
a landing post attached to said central frame member for initially engaging said object with said frame end members in said open position.

13. The structure set forth in claim 12, including:
said landing post being pivotally movable with said central frame member; and
opposing spring members attached between said landing post and said frame sections.

14. The structure set forth in claim 1, including:
rotational mount means mounting said boom assembly for circumferential movement; and
counterbalance means for substantially balancing the weight of said boom assembly.

15. The structure set forth in claim 1, including:
boom mount means mounting said boom assembly for movement longitudinally of said generally cylindrical object, said boom mount means including opposing track sections having rollers thereon for engaging and rollably supporting said boom member.

16. The structure set forth in claim 1, wherein said indexing means includes:
an annular gear ring and means mounting said annular gear ring on said frame assembly for rotation with respect thereto.

17. The structure set forth in claim 16, including:

boom mount means mounting said boom for longitudinal movement with respect to said object;
said boom being elongated and having flat side portions; and
said boom mount means including opposing track portions having rollers positioned to engage said boom flat side portions.

18. The structure set forth in claim 17, wherein said indexing means includes:
a rack gear mounted onto said boom; and
boom drive means mounted onto one of said opposing track portions and including a drive gear engaging said boom rack gear for moving said boom in opposite, longitudinal directions.

19. The structure set forth in claim 16, including:
circumferential drive means mounted with said frame assembly and including a gear drive for engaging said annular gear to rotate same in opposite circumferential directions.

20. The structure set forth in claim 1, wherein said boom head includes:
tool support means for mounting said tool; and
pivot means mounting said tool support means onto said boom for pivotal movement toward and away from said object surface.

21. The structure set forth in claim 20, including:
hydraulic power means for urging said tool support means toward said object surface;
said tool utilizing a fluid for application to said object surface; and
said hydraulic power means utilizing said tool fluid.

22. The structure set forth in claim 21, including:
spring means attached between said boom and said tool support means for urging said tool support means away from said object surface.

23. The structure set forth in claim 20, wherein said tool support means includes:
angular position means for adjusting the angular position of said tool within a plane transverse to the longitudinal axis of said generally cylindrical object.

24. The structure set forth in claim 20, including:
said pivot means including parallel link arms pivotally attached between said boom and tool support; and
one or more substantially hemispherical members mounted for movement with said tool support means for continually engaging said object surface in spite of variations therein and for maintaining said tool in said tool support at a predetermined distance from said object surface.

25. The structure set forth in claim 1, wherein said indexing means includes:
a rotation hydraulic drive; and
said rotation hydraulic control means including a constant displacement hydraulic network for driving said rotation hydraulic drive and boom assembly through a rotational cycle of a predesignated angular increment.

26. The structure set forth in claim 25, wherein said rotation hydraulic control means includes:
first switch means creating a pressure build-up in response to completion of said rotational cycle.

27. The structure set forth in claim 26, including:
a boom hydraulic drive for moving said boom between extended and retracted positions longitudinally of said object; and said boom hydraulic control means actuating said boom hydraulic drive for moving said boom in a first longitudinal direction in response to said pressure build-up caused by said first switch means.

28. The structure set forth in claim 27, including:
said boom hydraulic control means including second switch means positioned in part with said boom for creating a pressure build-up in response to completion of movement of said boom in a first longitudinal direction.

29. The structure set forth in claim 28, including:
said rotation hydraulic control means including means for driving said rotation hydraulic drive and boom assembly through another predesignated angular increment in response to said pressure build-up caused by said second switch means.

30. The structure set forth in claim 29, including:
said first switch means creating a pressure buildup in response to completion of said predesignated angular increment; and
said boom hydraulic control means actuating said boom hydraulic drive for moving said boom in a second longitudinal direction opposite to said first longitudinal direction in response to said pressure build-up.

31. The structure set forth in claim 25, wherein said hydraulic network includes:
a hydraulic cylinder having a piston mounted therein, one side of hydraulic cylinder being in fluid communication with said rotation hydraulic drive such that said rotation hydraulic drive is driven in response to displacement of said piston.

32. The structure set forth in claim 25, including:
an auxiliary hydraulic cylinder having a piston mounted therein, said hydraulic cylinder being in selective fluid communication with said rotation hydraulic drive; and
means for adjusting the stroke of said auxiliary hydraulic cylinder piston in order to adjust the angular increment movement of said boom.

33. The structure set forth in claim 28, wherein said second switch means includes:
a hydraulic cylinder and piston-rod assembly mounted on said frame;
said boom having mounted therewith means for engaging and displacing said piston-rod assembly in order to create a pressure build-up; and
means for deactuating said boom hydraulic drive and actuating said rotation hydraulic drive in response to said pressure build-up.

34. The structure set forth in claim 1, wherein said intercontrol means includes:
means activating said boom hydraulic control means and said rotation hydraulic control means in response to pressure signals generated by said intercontrol means at the end of said boom travelling a predesignated distance in either a longitudinal direction or a circumferential direction.

35. The structure set forth in claim 1, wherein said intercontrol means includes:
signal means for generating pressure signals at the end of predesignated circumferential or longitudinal travel of said boom assembly; and
activation means for activating said boom hydraulic control means and said rotation hydraulic control means in response to said pressure signals to move said boom in a longitudinal direction or in a circumferential direction, respectively.

36. Apparatus for temporary positioning about a generally cylindrical object for indexing a tool across the surface thereof, comprising:
a frame assembly and means for temporarily opening said frame assembly to receive a cylindrical object;
a boom assembly including a boom and a boom head, said boom head including tool mount means adapted to mount a tool for movement with said boom head;
indexing means for moving said boom assembly longitudinally and circumferentially of said pipe surface thereby positioning said tool to perform a designated treatment on said cylindrical object;
said frame assembly including first and second semicylindrical frame sections pivotally connected together and pivot means for pivoting said frame sections between an open position to receive said pipe and a closed position with said cylindrical object positioned within said frame sections;
an annular gear ring having first and second gear sections mounted with said first and second frame sections; and
gear pivot means mounting said gear sections for pivotal movement between open and closed positions with said first and second frame sections.

37. The structure set forth in claim 36, including:
means mounting said gear ring for rotational movement about said first and second frame sections in a closed position.

* * * * *